United States Patent [19]

Desrus

[11] Patent Number: 5,525,881
[45] Date of Patent: Jun. 11, 1996

[54] METHOD AND APPARATUS FOR THE THERMAL CONTROL OF AN ELECTRIC MOTOR IN A VEHICLE, AND THEIR APPLICATION TO A POWER ASSISTED STEERING SYSTEM

[75] Inventor: Dany Desrus, Fresnes, France

[73] Assignee: Valeo Systemes D'Essuyage, France

[21] Appl. No.: 422,669

[22] Filed: Apr. 10, 1995

Related U.S. Application Data

[63] Continuation of Ser. No. 999,101, Dec. 31, 1992.

[30] Foreign Application Priority Data

Jan. 3, 1992 [FR] France .................................. 92 00029

[51] Int. Cl.$^6$ .............................. H02P 1/04; H02H 5/04; B62D 5/00
[52] U.S. Cl. .......................... 318/471; 318/473; 388/934; 361/25; 180/446
[58] Field of Search .................................. 361/24, 25, 26, 361/28; 318/471–472, 473, 488, 549; 180/79.1, 142, 6.28, 141, 76, DIG. 1, DIG. 3; 388/934

[56] References Cited

U.S. PATENT DOCUMENTS

| | | | |
|---|---|---|---|
| 4,525,763 | 6/1985 | Hardy et al. | 318/472 |
| 4,567,413 | 1/1986 | Yabe et al. | 318/472 |
| 4,611,682 | 9/1986 | Yasuda et al. | 318/488 |
| 4,717,984 | 1/1988 | Henry et al. | 361/25 |
| 4,771,843 | 9/1988 | Shimizu | 180/79.1 |
| 4,771,845 | 9/1988 | Shimizu | 318/473 |
| 4,986,379 | 1/1991 | Morrshita | 318/599 |
| 5,103,926 | 4/1992 | Ohno et al. | 180/142 |
| 5,168,415 | 12/1992 | Osuga | 361/28 |

FOREIGN PATENT DOCUMENTS

| | | | |
|---|---|---|---|
| 0214025 | 3/1987 | European Pat. Off. | H02H 6/00 |
| 2277513 | 1/1976 | France | H02H 9/02 |
| 4030475 | 4/1991 | Germany | H02H 6/00 |

OTHER PUBLICATIONS

Energy & Automation (Siemens) Product News Standard Products, vol. 13, No. 1, Jan. 1, 1991, Armin Fischer et al.: "Digital Motor Protection with New Thermal Replica of the Rotor Circuit", p. 23.

*Primary Examiner*—John W. Cabeca
*Attorney, Agent, or Firm*—Morgan & Finnegan

[57] ABSTRACT

The electric motor is part of an electro-mechanical actuating system that is especially applicable to power assisted automotive steering systems.

A phase for monitoring the cooling of the electric motor is carried out when the motor is inoperative in order to produce a value for a restarting temperature. This value is used during an electrical motor thermal control phase when the motor is operative. This prevents the motor from exceeding a maximum permissible temperature.

5 Claims, 8 Drawing Sheets

METHOD AND APPARATUS FOR THE THERMAL CONTROL OF AN ELECTRIC MOTOR IN A VEHICLE, AND THEIR APPLICATION TO A POWER ASSISTED STEERING SYSTEM

This is a continuation of co-pending Ser. No. 07/999,101, filed on Dec. 31, 1992.

BACKGROUND OF THE INVENTION

1. Field of the Invention

The present invention is concerned with a method and an apparatus for the thermal control of an electric motor fitted in a vehicle, the electric motor being part of an electromechanical actuating system of the vehicle. It is especially applicable to a power assisted steering system.

2. Description of the Prior Art

Actuating systems mounted in vehicles are subjected to temperature environments which vary from one zone to another within the same vehicle.

In addition, it is known that electric motors dissipate energy due to the Joule effect in their windings, especially when they are under mechanical load. In the extreme case, when the rotor of the motor is stopped by too large a mechanical load, the motor, supplied with unidirectional current, behaves largely like a resistor.

Electric motors are very often equipped with thermal decoupling devices which detect when the safe temperature of the motor is exceeded by too large an amount while it is operating. Such devices include for example thermocouple devices which interrupt the supply to the electric motor, for example.

However, these devices, necessary though they may be, do not detect environmental variations truthfully, and in addition they work in a static manner. In particular, they only detect relatively long-term mean values.

In addition, the opening of the relay that connects the electric motor to its power supply is controlled in an abrupt manner. This feature is a drawback when it is desired to avoid any shock in the drive via the actuating system in which the electric motor is installed. Thus, when the actuating system operates in a continuous mode, the thermal control systems of the prior art introduce a discontinuity which is detrimental to the actuating system.

Furthermore, when the actuating systems are fitted in a vehicle, cooling of the electric motor takes place substantially exponentially, with a characteristic cooling time constant. In this connection, when the driver of the vehicle in which the electric motor is fitted interrupts the general power supply by turning the ignition key, the electric motor, being connected to the general power supply of the vehicle and being thus interrupted, cools down slowly. In a typical example, it passes from its nominal operating temperature (150° in one example) to the ambient temperature (20°) in about thirty minutes. If the vehicle is restarted, or there is a call for use of the electric motor, before this period of return to ambient temperature has elapsed, the thermal control of the motor does not start from a predetermined initial state.

This is also the case when an electronic controller calls for the power supply to the actuating system to be stopped.

In a power assisted steering system, depending on driving situations and/or the attitudes of the vehicle, the calls for changes of direction of the steerable road wheels are interpreted by an electronic computer which controls the electrical supply of a motor that serves as a mechanical energy source. If the thermal load on the electric motor reaches too high a value, a conventional thermal protector, such as a thermocouple, causes the power assistance for the steering to be interrupted suddenly. As a result, the driver would receive a shock on the steering column which would be dangerous.

SUMMARY OF THE INVENTION

The present invention provides a novel means for overcoming these drawbacks of the prior art.

In this connection, the invention is concerned with a method for the thermal control of an electric motor fitted in a vehicle, which is characterised in that there are performed, at instants which are predetermined and repeated in accordance with the state of operation of the electric motor:

a step of thermally monitoring the electric motor when it is not being supplied with power, during which a computation of the temperature of the motor as a source of heat is performed on the basis of a measurement of the ambient temperature of the environment of the motor as a medium for dissipation of the heat produced by the motor, whereby to produce a value of restarting temperature for the electric motor;

a step of thermal control of the electric motor when the motor is being supplied with power, by estimation of a condition for stopping the electric supply to the motor on the basis of a further computation of the instantaneous temperature of the motor, the measurement of the ambient temperature, the said value of restarting temperature, and the measurement of the effective current flowing through the windings of the motor, whereby to protect the electric motor and/or its environment from too large an increase in temperature.

In one embodiment, the step of thermal monitoring and/or the step of estimating a stopping condition is executed at predetermined and repeated instants.

In one embodiment, the temperature of the motor is measured on the principal source of heat of the electric motor, such as the winding of the electric motor.

In a preferred embodiment, the temperature of the motor is measured using the current flowing through the winding which is the heat source.

The invention is also concerned with an apparatus for the thermal control of an electric motor, characterised in that it comprises:

a device for measuring the instantaneous temperature of the motor;

a device for measuring the ambient temperature of the motor;

a device for measuring the restarting temperature of the motor before the motor is supplied with power;

a means for comparing the said temperature of the motor and the said ambient temperature with a prerecorded condition for stopping the operation of the motor, whereby to produce a signal for interrupting the electrical supply of the motor;

a means for connecting the electrical supply to the electric motor, responsive to the said interruption signal.

The invention is applicable to a power assisted steering system, of the type including an electric motor for generating mechanical energy to assist direction changing, characterised in that it includes a thermal control apparatus such as is defined above, and in that the connection means comprises an element for generating a graduation in the stopping and/or restarting of the said power assisted steering system.

According to another aspect of the invention, the stage in which the motor is thermally monitored is extended for a predetermined period of time starting with the termination of operation of the electric motor, while the stage in which the electric motor is thermally controlled while being supplied with power, by estimating a stopping condition, is activated as of the call for the motor to be put into operation, whereby to protect the electric motor as soon as it has been put into operation.

Further advantages and features of the present invention will be understood more clearly with the aid of the description and drawings.

DESCRIPTION OF THE PREFERRED EMBODIMENTS

Figure 1:
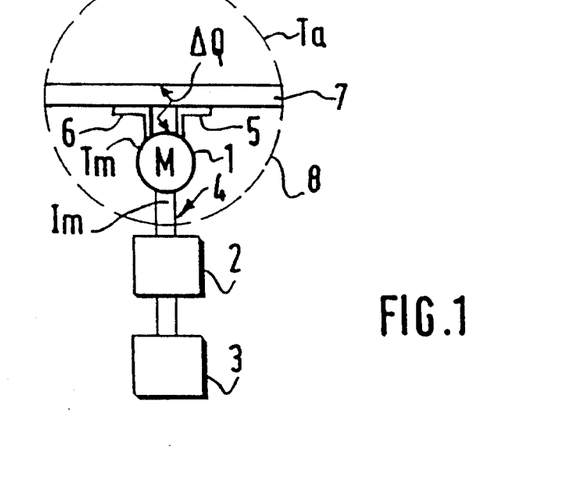
FIG. 1: a diagrammatic representation of the thermal system comprising the electric motor and its environment.

In FIG. 1, a thermal system is shown which consists of the electric motor and its environment. This environment may be that of a vehicle. The motor may be disposed in it, in zones having thermal states that vary in different ways. In this connection, the electric motor may be disposed in the compartment in which the propulsion motor of the vehicle is situated, and in which a very high temperature prevails and very large heat transfers take place. It may be disposed in the cabin of the vehicle in which the heat transfers are more moderate, in particular when the cabin is air conditioned.

The means of the invention provides adaptation for these different situations.

The electric motor 1 is connected through electric wires 4 to a power supply controller 2, which transmits to it electrical energy derived from a source 3 of electrical energy in accordance with operating characteristics with which the present invention is not directly concerned, and which will not be described further.

The electric motor 1 is mounted on a structure 7, such as the chassis of the vehicle, by means of thermally conductive supports 5 and 6. The whole constitutes the thermal operating environment of the electric motor, this environment comprising, in particular, the streams of cooling air etc. The motor 1 has a temperature Tm, while the environment 8 is at an ambient temperature Ta. Heat transfers are represented by Q.

It will be understood that rigorous analysis of the heat transfers would in theory lead to perfect thermal control. Such thermal control, which would be based on knowledge of the thermal resistances between the different parts of the thermal system, and on the measurement of the heat transfers taking place along each heat exchange path, would enable such a result to be achieved.

However, the invention proposes a way which is less costly in terms of computing power, and which enables the invention to be easily adapted to widely varying environments.

The invention starts with an analysis which is better adapted for reliable reduction to practice using inexpensive means. In this connection, the electric motor 1 has characteristics which are determined in advance from the thermal point of view. In particular, once installed in the vehicle, it supports a maximum given ambient temperature. The motor temperature increases as a function of the motor current flowing through it. Now this increase in temperature must be limited to a permissible value, in particular for reasons of mechanical integrity.

Figure 2:
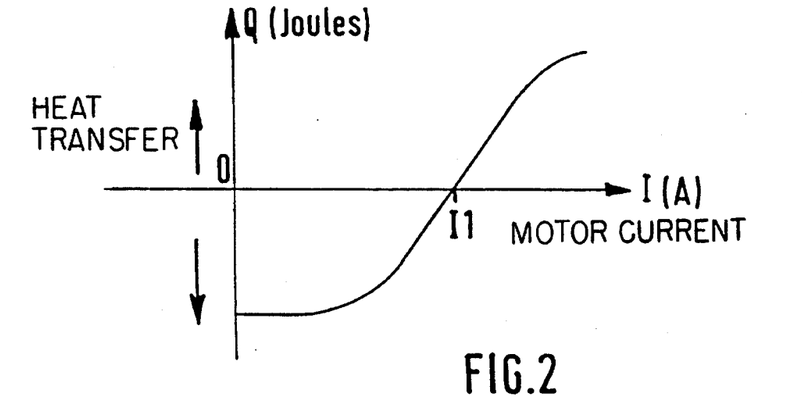
FIG. 2: a graph representing the heat transfers in the thermal system in accordance with the analysis of the invention.

In FIG. 2, there is shown a curve representing heat transfers Q (on the ordinate) as a function of the current Im flowing through the electric motor (on the abscissa), for predetermined time periods and in a given environment. When the motor current Im is smaller than a thermal equilibrium value I1, the electric motor yields its heat to the ambient environment.

When the motor current Im exceeds the equilibrium value I1, the motor becomes heated. Accordingly, its internal temperature Tm increases and may, depending on the thermal conditions, reach a temperature which exceeds its maximum permitted temperature. In practice, for a direct current motor having an electrical power smaller than 1 kilowatt, this maximum permitted temperature is of the order of 150° C., determined by the integrity of the insulator of the wires in the winding which is the source of heat in the electric motor.

Figure 3:
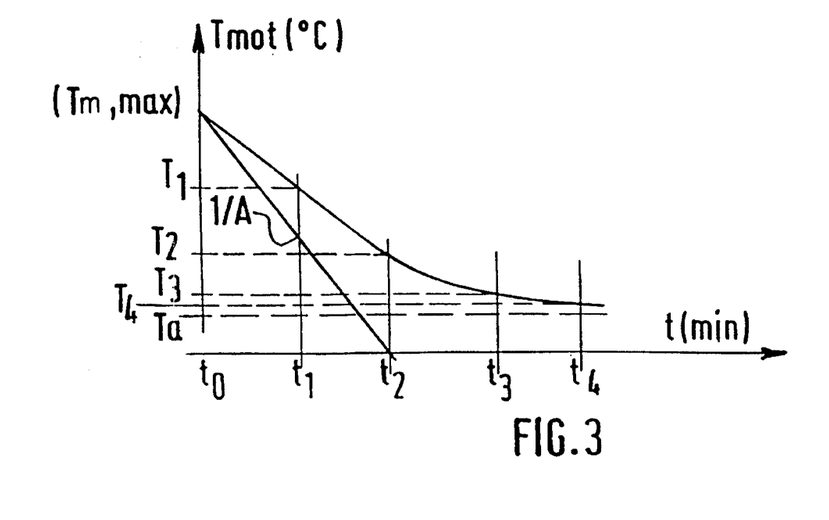
FIG. 3: a graph representing the cooling characteristic of the motor in accordance with the analysis of the invention.

The cooling of the motor when it ceases to be supplied with power is shown in FIG. 3. When the motor current is zero, the electric motor yields its heat to the ambient environment in accordance with an exponential characteristic, having a time constant which depends on local parameters. The temperature of the motor is shown on the ordinate, while the time in minutes which has elapsed since cutting of the electrical supply is shown on the abscissa.

The cooling of the motor has a time constant for cooling of the motor in its environment which is known in advance.

The variation in temperature of the motor is directly related to the cooling time by an equation having the form:

$$Tm - Ta = K \exp[-(1/A)(t-t0)] \quad (1)$$

where K is a constant which is characteristic of the system comprising the electric motor and its ambience, A is the cooling time constant, t0 is the instant at which cooling commences, t is the current instant, Tm is the instantaneous temperature of the electric motor during its cooling period, and Ta is the instantaneous ambient temperature. The temperature of the electric motor starts at the value (Tm,max) at the instant t0. This value is the last value estimated during the thermal control stage which will be described further on, and entered into a suitable working memory, the said working memory being protected, on interruption of the electrical power supply, at least as regards the address containing the temperature (Tm,max).

A and K are values obtained by previous measurement on the electric motor, depending on the vehicle and the position in which it is to be mounted in the vehicle.

Other cooling characteristics may be employed, according to the situations and technologies of electric motors and according to their environment.

In the foregoing analysis, it is seen that the invention comprises two distinct phases. In a first phase the motor is supplied with power, and its thermal pattern is monitored in such a way as to prevent a permissible maximum temperature being exceeded, as will be described later herein. In a second phase, the electric motor cools over a period of time which depends on the maximum temperature (Tm,max) attained by the motor and on its characteristics K and A, and on the ambient temperature Ta.

According to the invention, if the electric motor restarts before the ambient temperature has been reached by the motor, the thermal controller of the invention employs, as a first value of the motor temperature Tm, the value reached at the said instant of restarting during the cooling period. For a given motor, this restarting temperature is known from the duration of the cooling stage, that is to say the time during which the motor is not supplied with power.

In one embodiment, the restarting temperature is determined approximately by an electronic circuit, the output of which changes state at time intervals t0, t1, t2, t3, t4 up to a limited number.

If the electric motor is intended for use with inoperative periods, whether very short or very long, the length of its inoperative time only needs to be known approximately.

For example, to the extent that the period t2 has not elapsed, the output of the electronic circuit determining the restarting temperature remains in a first state, but once this period has elapsed, it assumes a second state.

Such a circuit is achieved using a non-volatile memory, at least during the said period t2, which records the maximum temperature (Tm,max) reached by the motor at the instant of its interruption, and by a programmable timer the operating period of which is equal to the period (t2–t0).

Figure 4:
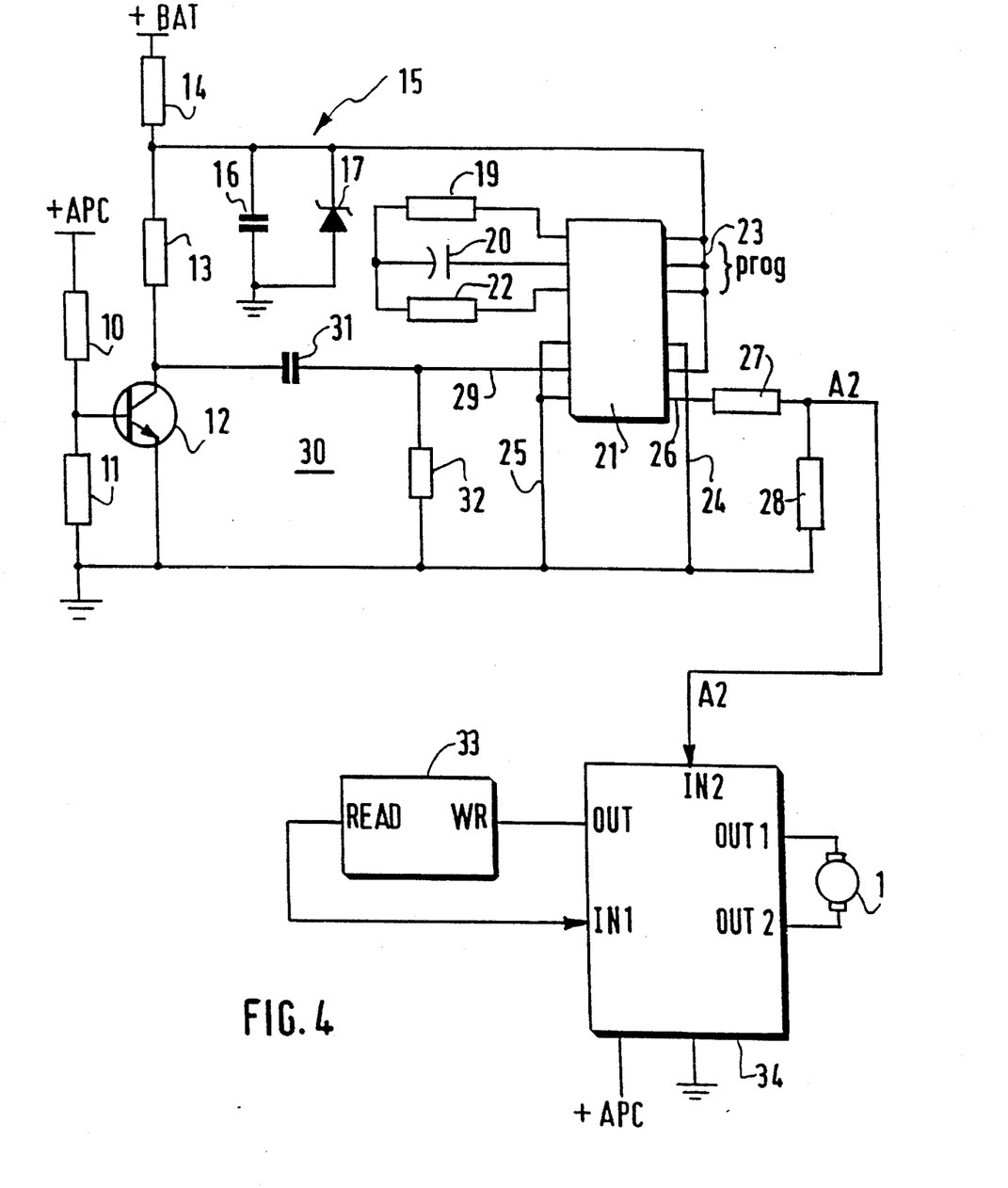
FIG. 4: a first embodiment of an electronic circuit for determination of a restarting temperature of the motor.

Such a circuit is shown in FIG. 4. Such a circuit enables consumption of electricity to be maintained only for the function of monitoring cooling in the controller of the electric motor. This electrical consumption can be drawn from "long life" or rechargeable electric batteries when the remainder of the controller is supplied with power. In a preferred embodiment, the electronic circuit draws its energy from the battery +BAT carried on the vehicle. This electrical voltage +BAT is transmitted through a resistor 14 to a regulating circuit 15, which comprises a capacitor 16 and a Zener diode 17. The electronic circuit for determining the restarting temperature of the motor comprises a circuit 18, consisting of a resistor 19 and a capacitor 20, which has a unitary time base, the circuit 18 being operative to set the programmable time interval of a circuit 21 which is a programmable timer. Such a circuit 21 consists of a Motorola MC14541B circuit. In addition, a circuit 30 enables a pulse to be generated on the wire 29 connected to the MR (master reset) input of the circuit 21, which enables counting of the number of basic time units elapsed since interruption of the power supply +APC of the motor to be started. The circuit 30 includes, from +APC, a divider bridge having two resistors 10 and 11, and a switching transistor 12, the emitter of which is put at a potential such as ground, with its collector being connected to a first terminal of a capacitor 31, its other terminal being connected to a resistor 32 and to the above mentioned line 29.

When the supply +APC is interrupted, only the restarting temperature determination circuit is supplied with the voltage +BAT. A pulse appears on the line 29, which starts the count of the time units determined by the circuit 18.

The line 23 enables the number of time units which the circuit 21 is to count to be fixed. When the time, corresponding to the period t2–t0 in FIG. 3, has elapsed, the output Q26 of the circuit 21, transmitted to the thermal controller 34, switches to the value "1", indicating that this period has elapsed.

In addition, the restarting temperature determination circuit includes a register 33, the write input WR of which is at all times in receipt of the operating temperature Tm of the motor when the latter is supplied with power from a suitable output OUT of the thermal controller 34. During the cooling period, the controller is inactive, but the register 33 retains its information about the motor temperature TM, which is in fact the last recorded motor temperature (Tm,max) of FIG. 3.

The restarting temperature determination circuit is the only element of the invention which is supplied at the voltage +BAT, and it initiates the counting sequence of the circuit 21. To the extent that this period (t2–t0) has not elapsed, the output Q, which is connected through the line 29 to an input IN2 of the thermal controller 34, remains at the value "0".

If a command for restarting then supervenes, the voltage +APC rises once again to its maximum value, which activates the thermal controller 34. The program entered in the thermal controller 34, which will be described later herein, then reads on a port IN1 the value recorded in the register 33 by way of restarting temperature for the motor, since its input IN2, connected to the line 29, transmits to it a value "0" indicating that the period (t2–t0) has not elapsed. The programmable timer circuit 21 is deselected.

If the period (t2–t0) initially programmed by the lines 23 on the circuit 21 has elapsed, the output Q of the circuit 21 changes state, and the controller 34 is activated later. It reads on its input IN2 the value "1" of the line 29, indicating to it that the period (t2–t0) has elapsed. It does not then read the register 33, but considers that the motor restarting temperature is equal to the ambient temperature Ta.

Figure 5:
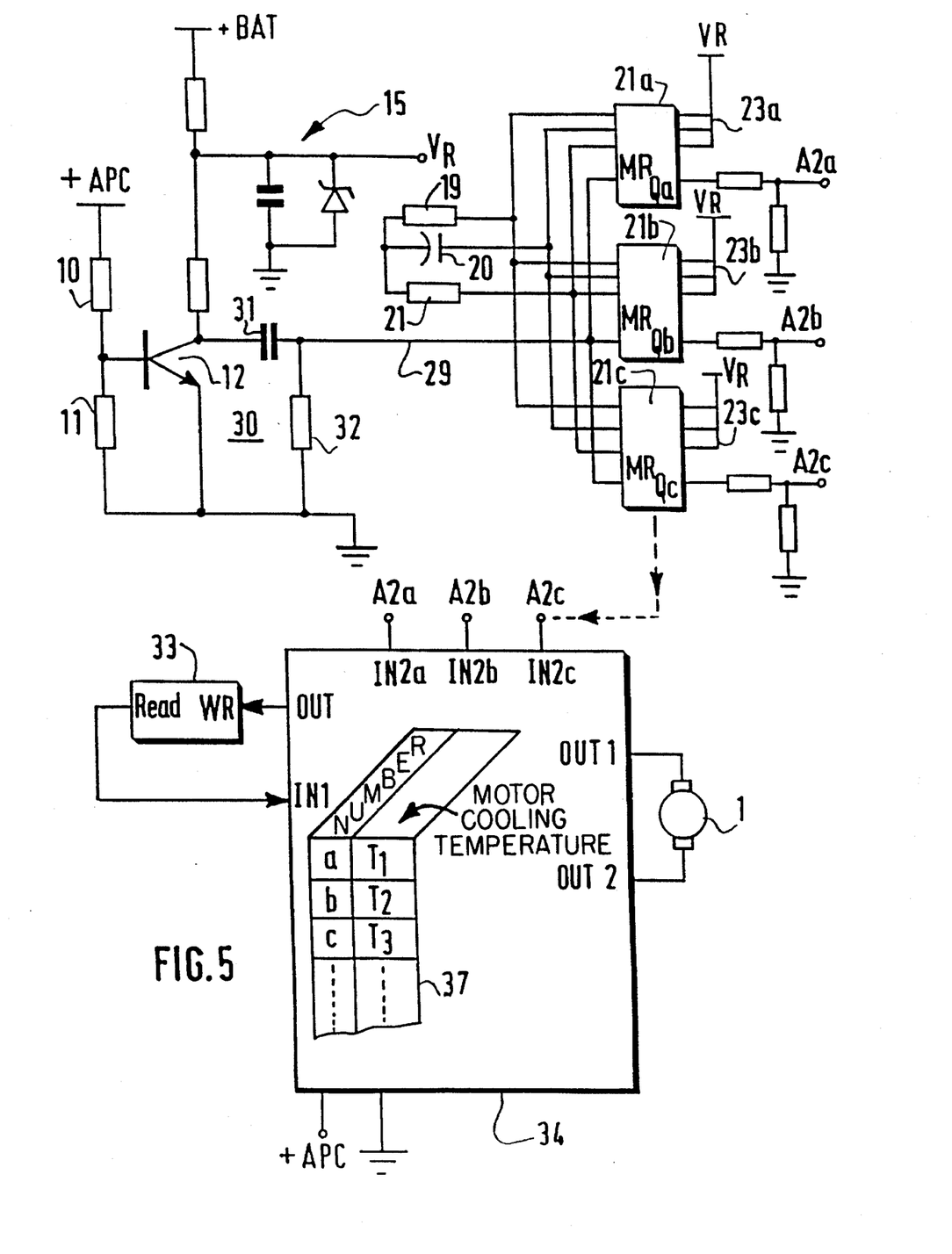
FIG. 5: a second embodiment of an electronic circuit for determination of a restarting temperature for the motor.

In another embodiment shown in FIG. 5, several circuits 21a, 21b, 21c, . . . , identical to the circuit 21, are connected in the same way to a circuit for detecting interruption of the electric power supply to the motor 1, a common regulator 15, and a common time base 18. Each of their program inputs 23a, 23b, 23c, . . . is programmed for respective periods (t1–t0), (t2–t0), (t3–t0), . . . (see FIG. 3). According to the periods which have elapsed, the microcontroller 34 receives on its inputs IN2a, IN2b, IN2c, . . ., which are dedicated for this purpose, the signals A2a, A2bn A2c, . . . from the outputs Qa, Qb, Qc, . . . of the N programmable timers which are energised over the successive periods. As a function of the number a, b, c, . . . of the programmable timer circuit 21a, 21b, 21c, . . . which has changed state, the controller 34 synthesises, with the aid of a table of values recorded in its internal memory 37, the value T1, T2, T3, . . . of the motor cooling temperature in accordance with the exponential characteristic (see FIG. 3).

This calculated cooling temperature is then used as the restarting temperature of the motor, as will be explained later herein.

Figures 6, 8:
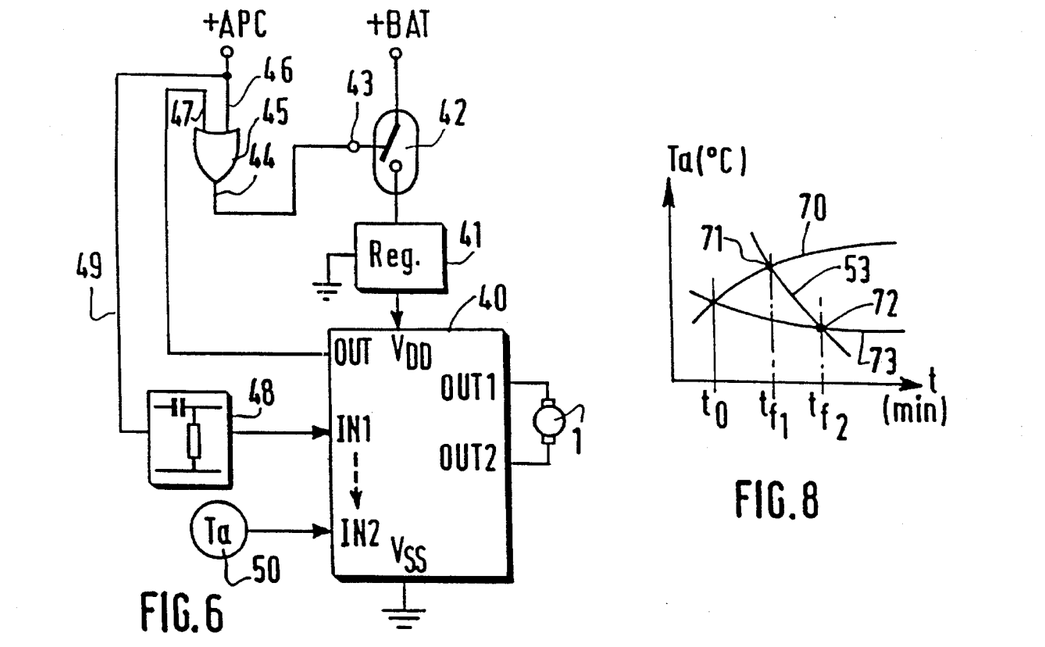
FIGS. 6 to 8: a diagram of a third embodiment of an electronic circuit for determination of a restarting temperature for the motor, together with two graphs to explain its operation.

In another embodiment shown in FIG. 6, the thermal microcontroller for the motor is supplied with power at least during a cooling period, in such a way as to follow the changes in cooling temperature with the aid of a recorded program. This period for monitoring thermal changes is terminated when the thermal microcontroller detects that the temperature Tm of the motor has reached ambient temperature.

In FIG. 6, the electronic circuit which enables a restarting temperature of the motor to be determined, consists principally of the thermal microcontroller 40, which is supplied with power from a generator circuit 41 at a regulated voltage Vdd, connected to the positive voltage terminal +BAT of the battery of the vehicle through a controlled interruptor 42.

The controlled interruptor may be a switching transistor or a relay. It may be of the monostable or bistable type, in a known manner.

The electronic circuit for determining a restarting temperature of the motor also includes a logic OR gate 45, a first input 46 of which is connected to the line +APC, for controlled power supply or for requesting operation of the electric motor 1, the said electric motor 1 being connected between the programmed output terminals OUT1 and OUT2 of the controller 40. A second input 47 of the OR gate 45 is connected to a programmed output OUT of the controller 40, and its output is high so long as the microcontroller is in a thermal monitoring phase.

The first input 46 of the OR gate 45 is also connected, through a line 49, to the input of a circuit 48 which detects the change of state of the line +APC. The output of the circuit 48 is connected to an analysis input IN1 of the microcontroller, in which a program scans the inputs in such a way as to carry out the predetermined processing operations.

The output 44 of the OR gate 45 is connected to the control terminal 43 of the controlled interruptor 42.

When the line +APC is deactivated at the instant t0, for example after interruption of the general power supply of the vehicle when the driver has turned off the ignition key, or when the function that calls for motor power generated by the motor 1 requires supply of power to the motor 1 to cease, the input 46 of the OR gate 45 passes to "0". However, the second input 47 remains at the level "1", because the microcontroller 40 is so programmed as to maintain its output OUT at "1" so long as the thermal monitoring phase has not been terminated, that is to say so long as the motor temperature has not reached the value Ta of ambient temperature.

Figure 7:
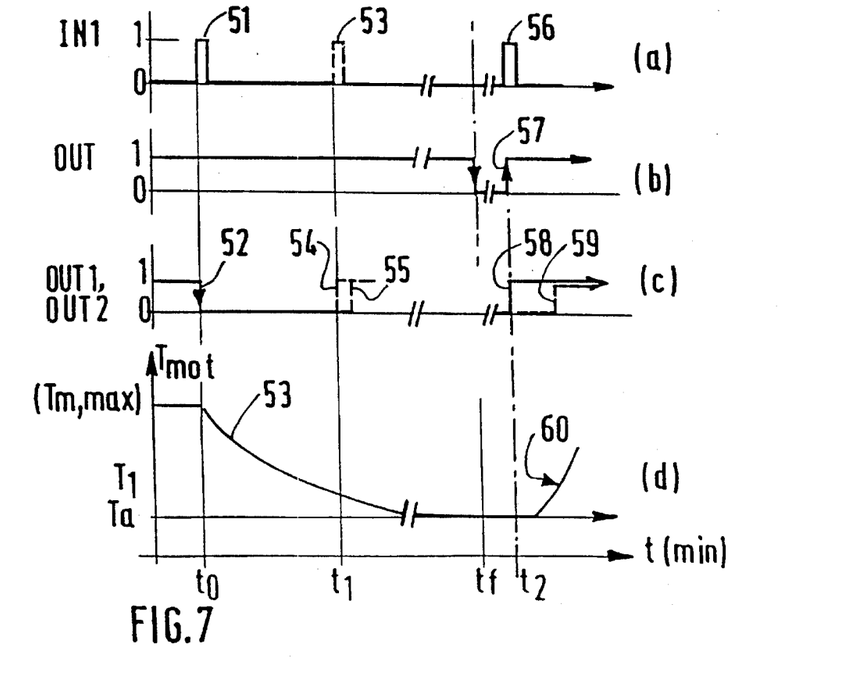

In FIG. 7, there are shown graphs (a), (b), (c) and (d) for operation of the microcontroller during this thermal monitoring phase while the motor is at rest.

At the instant t0, a pulse 51 appears on the input IN1, the output OUT remaining at "1". The power outputs OUT1 and OUT2, between which the motor 1 is connected, are thus interrupted (see the descending fronts 52 in graph (c) in FIG. 7) by the microcontroller 40.

There then commences the cooling of the motor shown in the graph (d) in FIG. 7. This cooling is simulated in the microcontroller 40 by a computing loop which executes, as a function of the time indicated by a timer which is internal to the microcontroller and which is not shown, the computation of the estimated temperature Tm of the motor during its cooling period, in accordance with the equation (1), given above, whereby:

$$Tm = Ta - K \exp[-(1/A)(t-t0)] \tag{1'}$$

The value (Tm,max) corresponds to the temperature reached by the motor at the instant t0. The cooling curve 53 in graph (d) in FIG. 7 is identical to that in FIG. 3 and will not be described any further.

If the line +APC changes state before the ambient temperature Ta has been reached, for example at the instant t1 (pulse 53 on line (a)), according to the restarting conditions prerecorded in the microcontroller, the temperature reached by the motor is T1, which is higher than ambient temperature.

In one embodiment, the ambient temperature is measured by means of a measuring probe 50 (FIG. 6), the output of which emits a measurement signal which is supplied to an input IN2 of the microcontroller 40, which digitises and periodically stores this item of data in an address of a working memory (not shown) of the micro-controller 40. This address will be read during the thermal control phase, the electric motor 1 being supplied with power, as will be explained later herein.

The ambient temperature probe 50 has to be read all the time during the thermal monitoring phase, even during simple cooling of the electric motor, because, depending on the heat sources which are connected directly or otherwise to the environment of the motor (i.e. the sun, the heat engine, etc. . . . ), this ambient temperature may change by large amounts.

Two cases 70 and 73 of variations in ambient temperature are shown in FIG. 8. The curve 53 of cooling of the motor may thus intersect, at 71 or 72 at different instants, the curve 70 or 73 of variation in the ambient temperature, these instants being tf1 or tf2 which determine cessation of the thermal monitoring process.

The microcontroller 40 activates its outputs OUT1, OUT2 through rising fronts 54, directly at the instant t1 of request 52, or with a delay 55 which is due to the thermal control program in accordance with criteria which are prerecorded, in particular in the control program for the actuating system.

From the instant tf (see (d) in FIG. 7), the temperature Tm of the motor is considered as being equal to the ambient temperature Ta. The microcontroller 40 compares continuously the contents of the above mentioned address of its working memory, in which the current value of the ambient temperature Ta is recorded, with the calculated value T of the motor temperature, on the basis of the equation (1') given above. When the two values Tm and Ta are equal within the limits of precision of the computation, the microcontroller 40 then decides to put its output OUT at "0", the effect of which is to cause the output 44 of the OR gate 45 to revert to "0". Accordingly, the terminal 43 of the controlled interruptor 42 being no longer supplied with power, the controlled interruptor 42 being of the monostable type, it opens, thus interrupting the power supply +BAT of the regulator circuit 41, and thus that of the microcontroller.

If at a subsequent instant t2, which may be a long time after the instant tf, the line +APC once again changes state so as to demand motor power of the motor 1, its temperature Tm having again become equal to the ambient temperature Ta, the first input 46 of the OR gate 45 returns to "1", which causes the output 45 to change state. This change of state closes the controlled interruptor 42, which activates the regulator circuit 41, which initiates the power supply to the microcontroller 40. The thermal monitoring program recorded in the microcontroller 40 is started, putting the output OUT at a high level (front 57). In addition, the program of the thermal controller carries out its part of electrical initiation of the supply OUT1, OUT2 for the electric motor 1, by putting these two outputs into suitable high states (direct rising front 58 or delayed rising front 59, depending on the control program for the actuator).

The temperature Tm of the motor then adopts a rising curve 60 ((d) in FIG. 7) due to the fact that a current flows in its windings. The process passes into the other phase of thermal control of the electric motor, now supplied with power, as will be described below.

The inventor has carried out a thermal analysis of the phenomena related to heating, and has shown that the analysis given below was verified by simple measurements.

When the electric motor is supplied through a voltage source, for example through programmed outputs OUT1 and OUT2 of a microcontroller such as the microcontroller 40 in FIG. 6, the main internal heat generating source in the electric motor produces electric power in the form:

$$Pg = Z \cdot (Ieff)^2 \qquad (2)$$

where Z is a parameter analogous to the equivalent impedence module of the motor (heat dissipating part), and (Ieff) is the effective intensity of the electric motor.

The environment serves as a medium for dissipating heat. Its power of dissipation of the form:

$$Qd = Mc \cdot dT + Q0 \qquad (3)$$

where M is the equivalent mass capable of absorbing heat, c is the specific heat per unit of mass, and dT is the elevation in temperature of the mass M during one unit of time, while Q0 is the power that can be dissipated by the environment of the windings before their temperature increase dT. The dissipable power Q0 is expressed by an equation:

$$Q0 = R \cdot (Tm - Ta) \qquad (4)$$

where R is a radiation coefficient, and Tm and Ta have already been explained.

It is known that it is possible to equate the two quantities, since the system comprising the motor and its environment is a closed system:

$$Z \cdot (Ieff)^2 = Mc \cdot dT + Q0 \qquad (5)$$

It can therefore be seen that the value dT is able to increase at a greater or lesser rate as a function of the effective value of the current.

It will be noticed that for dT=0, which corresponds to the thermal equilibrium of the system (see FIG. 2), there is an equilibrium current I1 given by the equation:

$$(I1)^2 = Q0/Z \qquad (6)$$

In the microcontroller of the invention, a circuit computes the instantaneous value Tm(n) of the motor temperature, taking into account the fact that, during a time period s corresponding to the sampling which is carried out naturally by the program recorded in the microcontroller, we have:

$$dT = (Tm(n) - Tm(n-1))/s \qquad (7)$$

where the instant t is defined by the equation:

$$t = t0 + n \cdot s \qquad (8)$$

Substituting in equation (5) gives:

$$Z \cdot (Ieff)2 = Mc \cdot (Tm(n)) - Tm(n-1))/s + R \cdot (tm(n) - Ta) \qquad (9)$$

which enables the instantaneous value Tm(n) to be calculated in a general manner as a function of the preceding value, of the effective value of the current, and of the ambient temperature at the instant n:

$$Tm(n) = (B \cdot Tm(n-1) + R \cdot Ta - Z \cdot (Ieff)^2)/B \qquad (10)$$

where B equals Mc/s.

The values B, s, R and Z are recorded and/or known beforehand. The values Ta and Ieff are calculated over given periods, which may be different from the period s. The value Tm(n-1) corresponds to the preceding value of the motor temperature recorded in the working memory.

During the initiation of the stage 111 of thermal control of the electric motor while the latter is being supplied with power, the value Tm(n-1) consists in fact of the restarting value defined previously during the cooling phase carried out by the stage 110 in which the restarting value, $T_r$, is computed, and which is also referred to as the thermal monitoring of cooling stage 110. The temperature $T_r$ is equal to the cooling temperature of the motor.

If the cooling period has been long enough, the restarting temperature $T_r$ is known to be equal to the ambient temperature (see FIG. 3).

Before the restarting temperature becomes equal to Ta, it is computed by one of the embodiments in FIGS. 4 to 6.

Figure 9:
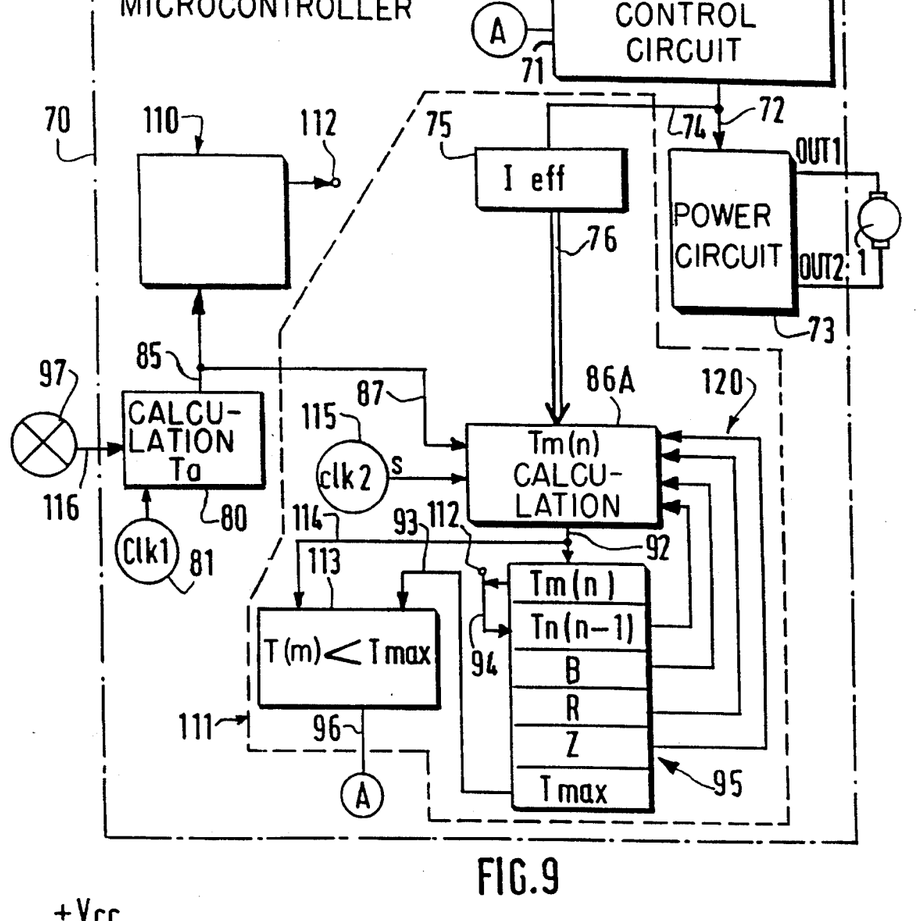
FIGS. 9 and 10: two embodiments of a thermal controller in accordance with the invention, which is adapted to carry out the stage of thermal control of the electric motor while it is being supplied with power.

FIG. 9 shows one embodiment of such a microcontroller 70, which can be completed, as required, by one or other of the circuits 110 already described in the embodiments of FIGS. 4 to 6.

The microcontroller 70 includes a control circuit 71 which carries out a control program, with which the invention is not directly concerned, in such a way as to produce a control signal 72 for controlling a power circuit 73, which includes two outputs OUT1 and OUT2 already described above, with the electric motor 1 being connected across its terminals.

The thermal control circuit of the invention includes at least one working memory 95, in the addresses of which are written the following:

the maximum permissible value Tmax for the motor temperature Tm;

the value of the motor temperature Tm(n-1) at the preceding instant;

the previously established values B, Z and R defined above in connection with the equation (10).

The thermal control circuit includes a circuit 75 for computing the effective value of the current in the motor 1.

In one embodiment which is not shown, the circuit for computing the effective value of the motor current includes a means for measuring the instantaneous current flowing through the windings of the motor 1. The output of the current measuring means is passed to an integrator of the quadratic value of this measurement signal over a predetermined period of time (for example 30 seconds).

In another embodiment, the effective value is directly derived through a correspondence table which has been previously entered in the circuit 75, the addresses of which are selected by an input 74 which is connected to the output 72 of the control circuit, and which makes use of the value of the control signal supplied to the control circuit 73.

The output 76 of the circuit 75 is connected to one input of a circuit 86A for computing the instantaneous value Tm(n) of the motor temperature by using equation (10). This circuit has inputs 120 which are connected to addresses of the working memory 95, in order to supply the values Tm(n−1), B, R and Z already explained.

In addition, the circuit 86A receives the prevailing value Ta of the ambient temperature Ta produced by a circuit 80.

In addition, the circuit 111 includes a timer 115 which emits a signal s corresponding to, or representing, the time period for the temperature change dT which has already been defined in equation (10) employed in the circuit 86A.

The circuit 86A has an output 92 which produces a digital value Tm(n) of the calculated instantaneous motor temperature, which is recorded in a corresponding address in the working memory 95.

Before execution of the subsequent computing step n+1, the address in the memory 95 that contains the preceding value Tm(n−1) is reset by the value Tm(n). While Tm(n) is being calculated for the first time, the address containing the preceding value Tm(n−1) is reset using the value $T_r$ produced at an output 112 of the circuit 110, in which the value $T_r$ of the restarting temperature of the motor is computed, this circuit 110 having been described above.

The circuit 80 which calculates the value of the ambient temperature Ta receives through an input 116 the output signal from an ambient temperature measuring probe 97. The circuit 80 operates with the aid of a timer 81, the period of which may be different from the period s of the above mentioned timer 115.

The output 85 of the circuit 80 is taken firstly to one input of the circuit 110, and secondly to a suitable input 87 of the circuit 86A.

The input 114 of a comparator 113 is connected to the output 92 of the circuit 86A which calculates the instantaneous motor temperature Tm(n). This comparator has a second input 93, which is connected to one address of the working memory 95 in which the maximum permissible value Tmax of the motor temperature has been previously entered. The comparator 113 carries out the comparison between the values Tm(n) and Tmax, in such a way that the output 96 generates a stop signal A which is transmitted to a suitable input of the control circuit 71.

If the instantaneous temperature exceeds the threshold Tmax, the control program of the circuit 71 detects the stopping signal, and processes it in a way which depends on the actuator, as will be seen below.

Figure 10:
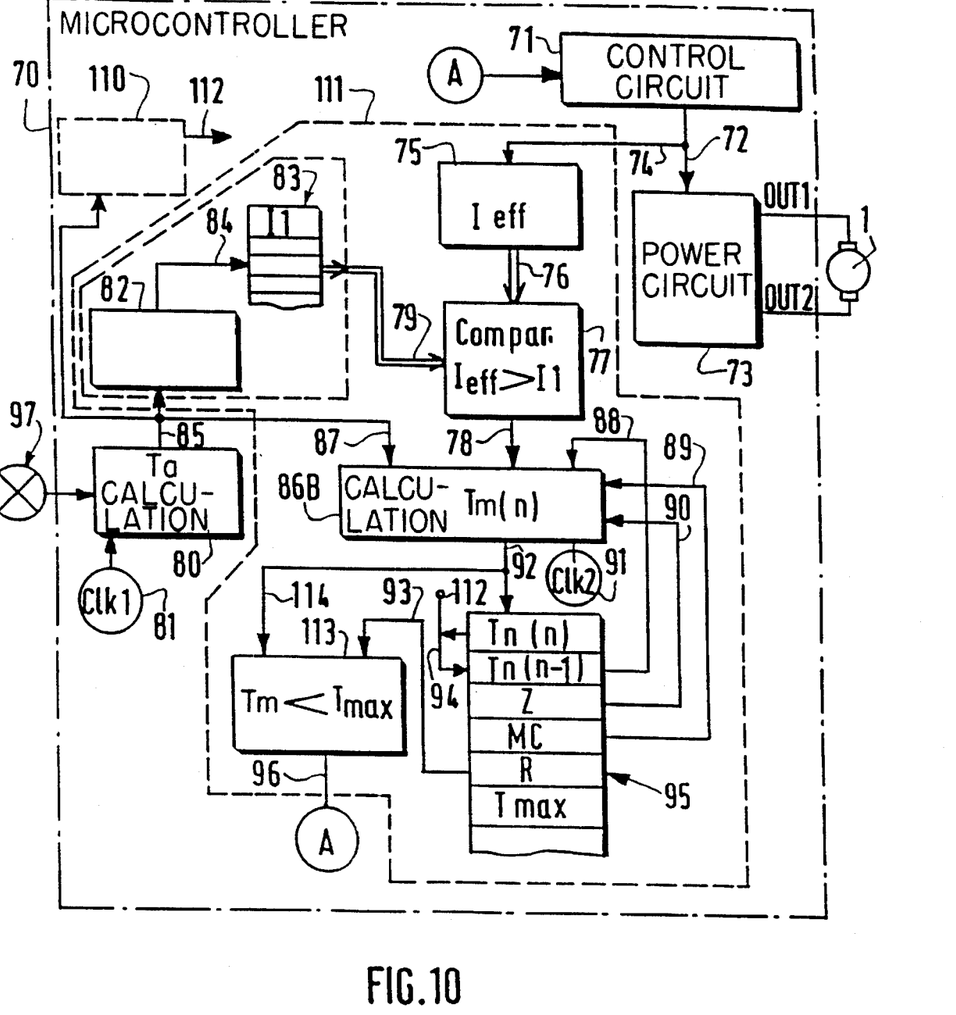

Another embodiment of a microcontroller 70 in accordance with the invention is shown in FIG. 10. Those elements which are similar to the embodiment of FIG. 9 carry the same reference numerals and will not be described any further.

In the embodiment of FIG. 10, the output 76 of the circuit 75 which measures the effective value Ieff is passed to a first input of a comparator 77.

The second input 79 of the comparator has a value equal to the equilibrium current I1, which is supplied by a computing means 82–84 for computing the equilibrium current defined according to equation (6).

The value I1 depends on the ambient temperature Ta supplied through an output 85 of the circuit 80. This value Ta is sent to the input of a circuit 82, which generates an address in which the equilibrium value I1 for the given temperature Ta must be read in a preloaded memory 83.

In addition, the comparator 77 includes a comparison output 78 which indicates if the effective current Ieff is greater than the equilibrium current I1. If the comparison is positive, the instantaneous temperature Tm(n) of the motor is produced by the first term in equation (9):

$$Z \cdot (\text{Ieff})^2 = Mc \cdot (Tm(n) - Tm(n-1))/s \qquad (9a)$$

In the converse case, the instantaneous temperature Tm(n) of the motor is produced by the second term of equation (9):

$$Z \cdot (\text{Ieff})^2 = R \cdot (Tm(n) - Ta) \qquad (9b)$$

The output 78 of the comparator 77 validates two pre-programmed computing devices in accordance with the equations (9a) and (9b), in such a way as to produce on the output 92 the new value Tm(n) of the instantaneous temperature of the motor.

The circuit 86b includes inputs 88, 89, 90 respectively, which receive the values Tm(n−1), Z and Mc or R, written into the working memory 95.

Figure 11:
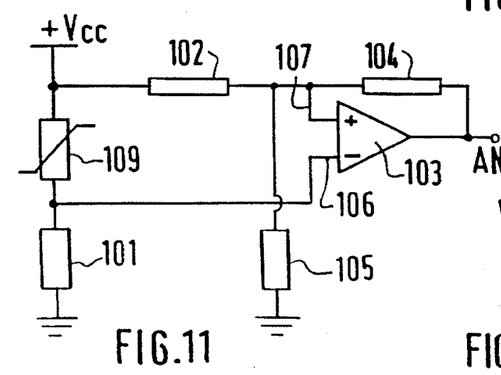
FIGS. 11 and 12: a diagram of one embodiment of an ambient temperature measuring circuit, together with a graph representing the measurement signal as a function of ambient temperature.

One embodiment of a circuit 80 for computing the ambient temperature Ta is shown in FIG. 11.

The ambient temperature measuring probe includes a thermistor 109 which is connected through a first terminal to a positive supply source +Vcc, and through a second terminal to a negative supply source such as ground, through a resistor 101. The common point between the thermistor and the resistor 101 is connected to an inverting input 106 of an operational amplifier 103. The first terminal of the thermistor is connected through a resistor 102 to a non-inverting input 107 of the amplifier 103. The non-inverting input 107 is connected to ground through a resistor 105, and to the output AN of the amplifier 103 through a resistor 104.

Figure 12:
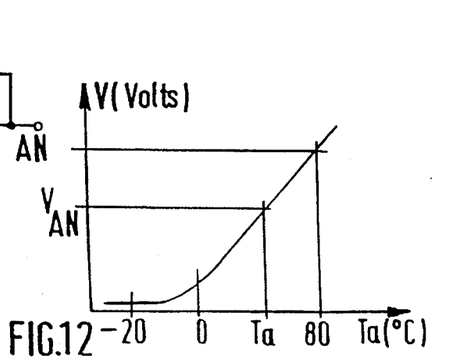

The output voltage V is shown in FIG. 12 as a function of the ambient temperature Ta. In an actual example, a characteristic was obtained which was a substantially straight line between 0° and 80°.

Figure 13:
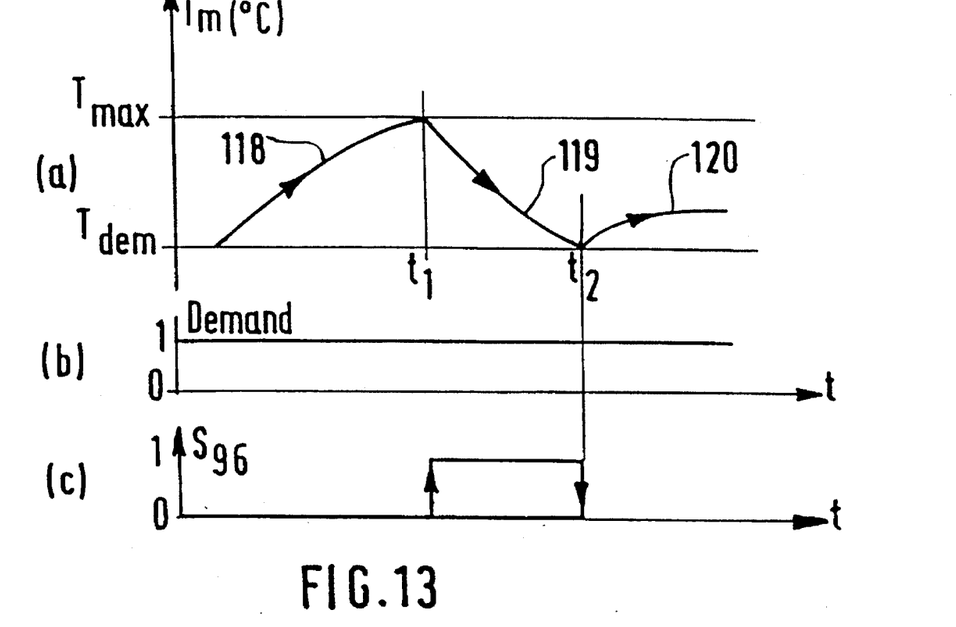
FIG. 13: operating diagrams for one embodiment of a thermal controller in accordance with the invention, for effecting hysteresis during restoration of the power supply to the electric motor after a limiting operating temperature has been exceeded.

FIG. 13 shows three operating diagrams for one embodiment of a microcontroller 70. When the temperature Tm increases during operation of the electric motor, in accordance with the curve 118, the maximum permissible temperature Tmax is reached at the instant t1. In diagram (b), the function of making a call for operation which is delivered to the control circuit 71 is not interrupted at that instant. However, the stop signal 96, shown in diagram (c) in FIG. 13, passes to the high level "1" via a rising front. This signal is received on the input A of the control circuit 71. It is processed by the control program of the actuator which is contained therein, and which can for example interrupt the supply OUT1, OUT2 for the motor 1 in order to provide thermal protection. In that case, the temperature Tm of the motor follows a cooling slope 119 which is followed by the circuit 110 of the microcontroller 70. When the temperature of the motor passes through the value $T_{call}$, which has previously been defined, the microcontroller 70 deactivates the output 96, which falls once again to the low state "0" at the instant t2. The circuit 110 supplies a restarting value $T_{call}$ to the circuit 111 via the input 112, and the control circuit 71 once more activates the power circuit 73, which again supplies power to OUT1, OUT2 and the motor 1. The latter is once again able to run, and its temperature again increases, in accordance with the curve 120 of diagram (a) in FIG. 13.

Figure 14:
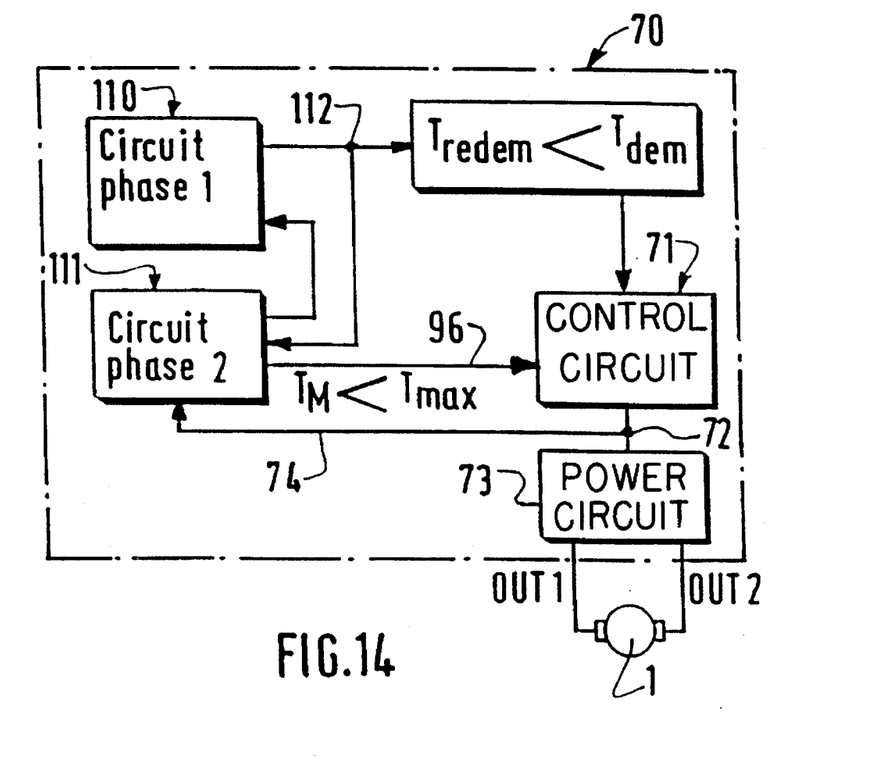
FIG. 14: a diagram of one embodiment of a thermal controller operating with restarting hysteresis.

FIG. 14 shows a diagrammatic embodiment of a microcontroller 70 which enables such an operation, involving hysteresis, to be carried out, in accordance with which, after having reached the maximum permissible temperature Tmax, the motor restarts from a lower temperature $T_{call}$.

Figures 15, 16:
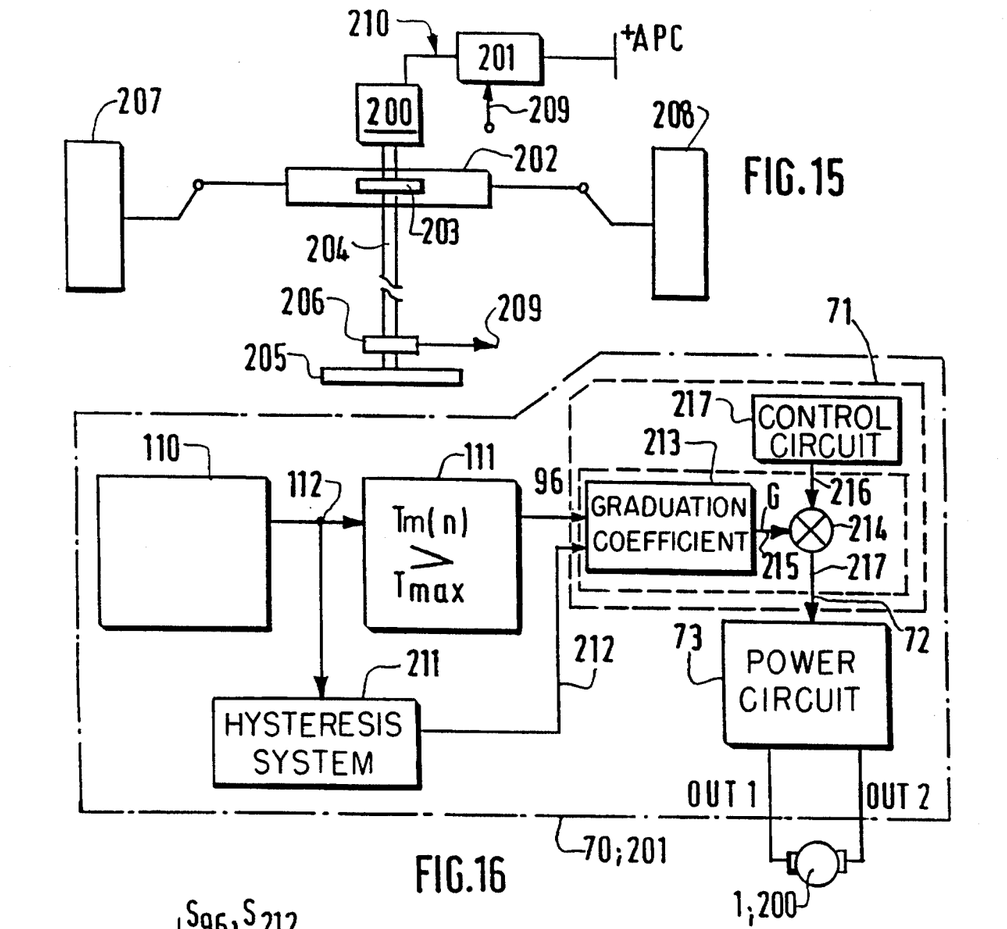
FIG. 15: a diagram of one embodiment of a power assisted steering system.
FIG. 16: a diagram of one embodiment of a controller having means which are adapted to introduce a graduation into the application of thermal protection commands issued by the controller of the invention.

One embodiment of a power assisted steering system for the steerable wheels 207, 208 of a vehicle is shown in FIG. 15.

The power assisted steering system includes a motor 200 which is supplied by a power source +APC through a microcontroller 201 incorporating the thermal protector described above.

The motor delivers its motive power, through a coupling member 203 such as a toothed pinion, to a direction changing member 202 such as a steering rack.

The direction changing member 202 is connected to the steerable wheels 207 and 208, and also receives a direction changing torque through a steering column 204, actuated by a driver through a steering wheel 205.

As is well known, a member 206, such as a torque sensor, produces through an output 209 an actuating signal received by the controller 201. The output 210 of the controller 201 then activates the motor 200.

FIG. 16 shows part of the microcontroller 70 or 201, having the thermal protector 110, 111 described earlier herein, and which also includes a means for generating a graduation during the change of state of the stopping signal 96 passed from the circuit 11 to the control circuit 71.

As has been described above, the microcontroller may be provided with the hysteresis system 211 which produces a signal 212 for reactivating the operation of the motor. The stop signal 96 and the reactivation signal 212 are fed to a circuit 213, which generates a coefficient of graduation G, which is fed to a first input 215 of a multiplier 214. A second input 216 of the multiplier 214 receives the output from the control circuit 217 upstream of the graduation generating means 213–216.

The multiplier 214 includes an output 217, which is connected to the input 72 of the circuit 73 which supplies power at OUT1, OUT2 to the motor 1; 200.

Figure 17:
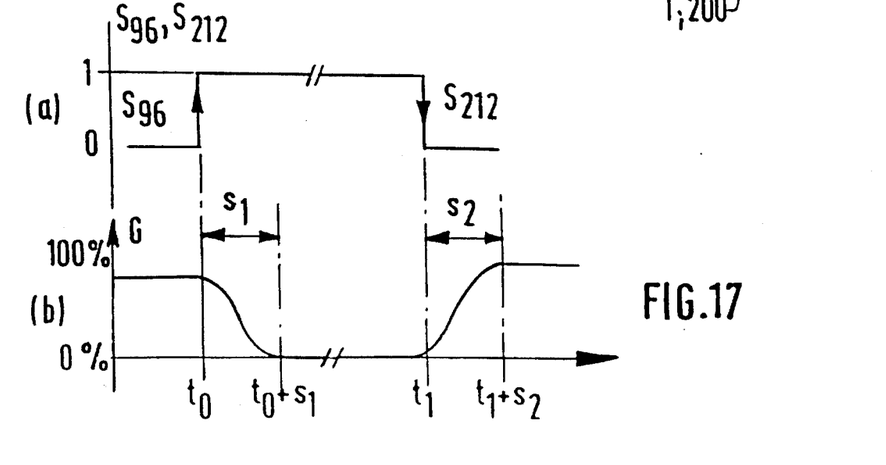
FIG. 17: diagrams of one operating cycle for the system of FIG. 16.

FIG. 17 shows a diagram, (a), of the change of state of the lines 96 and 212 connected to the circuit 213 for generating graduation.

The variation in the coefficient of graduation G applied to the input 215 of the multiplier 214 is shown in diagram (b) of FIG. 17.

When the stop signal S96 passes from "0" to "1", the coefficient of graduation changes continuously from 100% to 0%, in a pre-programmed ramp of the circuit 213, from the instant t0 of transition of S96 and over a predetermined time period s1.

From the instant t0+s1, the output signal 217 supplied to the input 72 of the power circuit 73 is zero. Consequently the motor is no longer supplied with power in a gradual manner, but also not in an abrupt manner, which, in the case of an actuator such as that in a power assisted steering system, would give rise to a detrimental shock.

When the reactivation signal S212 appears (descending front at the instant t1 in diagram (a) in FIG. 17), the coefficient of graduation G passes from 0% to 100% along a rising ramp which has been previously entered into the graduation generating circuit 213, for a time period of s2 starting at the instant t1. In consequence, the input 216 of the multiplier which has not varied is applied gradually to the input 72 of the power circuit 73.

Accordingly, the motor 1; 200 is gradually put back into operation, which similarly avoids any shock on reactivation when the thermal protection ceases to operate.

I claim:

1. A method for protecting an electric motor from damaging temperatures, which motor has both operative and inoperative times, the times each having predetermined and repeated instants that correspond to the operative and inoperative motor conditions and in which the motor has windings through which, selectively, an effective current flows, the motor being fitted in a vehicle and controlled in accordance with the motor temperature in an environment that has an ambient temperature, the steps comprising:

thermally monitoring the electric motor during the inoperative time, measuring the ambient temperature, of the environment computing the instantaneous temperature of the motor during the inoperative time, said computation being performed on the basis of said measurement of the ambient temperature of the environment of the motor as a medium for dissipation of the heat produced by the motor, whereby to produce a motor restarting temperature value for the electric motor;

registering the temperature of the electric motor when the motor is operative, said temperature registering step further including estimating a condition for rendering the motor inoperative, said estimating step including combining the computed instantaneous motor temperature, a measurement of the ambient temperature, said motor restarting temperature value, and measuring the effective current flowing through the windings of the motor, whereby to protect the electric motor from the damaging temperature; and performing these steps at the predetermined and repeated instants in accordance with the electrically operative and inoperative conditions of the electric motor.

2. A method according to claim 1, wherein said thermally monitoring step further comprises continuing for at least the predetermined period of time starting with the inoperative electric motor, said temperature registering step when the motor is operative being activated in response to the operative motor, whereby to protect the electric motor as soon as it is operative.

3. A method according to claim 1 or claim 2, further comprising the step of estimating the inoperative motor condition during the predetermined and repeated instants.

4. Apparatus for the thermal control, to a maximum permissible motor temperature value, of an electric motor that has windings through which, selectively, an electrical current flows only in times in which the motor is operative and in times in which the motor is inoperative, comprising:

a first circuit for computing in response to the inoperative motor time a restarting temperature while the electric motor is inoperative, said first circuit being activated during predetermined and repeated time periods that commence with the termination of operation of the electric motor;

a second circuit, for registering the electric motor temperature, said second circuit being activated in times in which the motor is activated to generate a signal that corresponds to an effective value of the current flowing through the motor windings and at least the value of the temperature when the motor becomes operative and coupling that signal to said second circuit, and a control circuit, whereby to produce a stop signal in said control circuit in response to the registration of the maximum permissible motor temperature value whereby to protect the electric motor as soon as it becomes operative.

5. A thermal control apparatus according to claim 4, further comprising a power assisted steering system responsive to the electric motor for steering assistance, and a further control circuit means for generating a graduation in stopping and restarting the power assisted system.

* * * * *